United States Patent [19]
Sevenhans et al.

[11] Patent Number: 5,528,636
[45] Date of Patent: Jun. 18, 1996

[54] DATA SYNCHRONIZATION DEVICE

[75] Inventors: Joannes M. J. Sevenhans, Brasschaat; Daniel Sallaerts, Aarschot, both of Belgium

[73] Assignee: Alcatel NV, Rijswijk, Netherlands

[21] Appl. No.: 222,672

[22] Filed: Apr. 4, 1994

[30] Foreign Application Priority Data

Apr. 2, 1994 [EP] European Pat. Off. .............. 93200954

[51] Int. Cl.$^6$ ............................... H04L 7/00; H04L 25/49
[52] U.S. Cl. .......................... 375/371; 375/293; 375/354; 375/355; 370/100.1
[58] Field of Search ..................... 375/371, 354, 375/355, 356, 377, 375, 366, 364, 362, 293; 370/100.1

[56] References Cited

U.S. PATENT DOCUMENTS

| | | | |
|---|---|---|---|
| 4,241,311 | 12/1980 | Massey . | |
| 4,514,854 | 4/1985 | Ashida . | |
| 5,056,120 | 10/1991 | Tanioushi et al. ........................ | 375/371 |
| 5,361,263 | 11/1994 | Urbansky ................................. | 375/371 |
| 5,394,443 | 2/1995 | Byers et al. ............................. | 375/371 |

FOREIGN PATENT DOCUMENTS

| | | |
|---|---|---|
| 3442613 | 5/1986 | Germany . |
| 9217967 | 10/1992 | WIPO . |

*Primary Examiner*—Scott A. Rogers
*Assistant Examiner*—Madeleine Au Nguyen
*Attorney, Agent, or Firm*—Ware, Fressola, Van Der Sluys & Adolphson

[57] ABSTRACT

A data, synchronization device adapted to re-synchronize a multi-level digital signal (IN; OUT) with an output or local clock signal (CLKO). In case of a binary signal, the device includes two counter systems (CA1-CC1, MAJ1, SEL1; CA0-CC0, MAJ0, SEL0) each associated with a logical level of the signal and counting the number of successive 1's or 0's respectively. These counter systems produce a count number including the number of counted bits and their level. The device further includes a decoder (DEC) generating in synchronism with the local clock signal (CLKO) a number of bits which is a function of the count numbers. These generated bits constitute the requested output signal (OUT). The data synchronization device further includes delay module (DEL) for deriving from an input clock signal (CLKI) received with the input signal (IN), three intermediate clock signals (OA-OC) shifted in phase with respect to each other and each controlling one of a set of three counters (CA1-CC1; CA0-CC0) included in each of the counter systems. The latter also each include a majority voting module (MAJ1; MAJ0) reading the numbers of bits counted by the three counters of the corresponding set, comparing these numbers and selecting the subset of at least two counters having counted a same number of bits. The number of bits counted by the majority of the set counters is assumed to be correct and is therefore transferred to the decoder (DEC).

12 Claims, 1 Drawing Sheet

DATA SYNCHRONIZATION DEVICE

TECHNICAL FIELD

The present invention relates to a data synchronization device adapted to derive a multi-level digital output signal synchronized with an output clock signal from a multi-level digital input signal associated to an input clock signal having substantially the frequency of said output clock signal.

BACKGROUND OF THE INVENTION

Data synchronization devices are generally known in the art and are used for re-synchronizing a digital signal, e.g. electrical or optical data transmitted on a high speed link, with an output or local clock signal. Existing data synchronization devices use a number of sampling algorithms which essentially differ from one another in their capability to overcome the different timing problems caused by phase jitter, phase wander and possible frequency offset between the input and output clock signals. In many existing sampling algorithms two different general principles can be recognized: the device either samples the received digital data input signal on a multiple tap delay line and organizes a switch-over between data taps based on a correlation operation performed over all the taps, or supplies the received input clock signal through a multiple tap delay line and organizes a switch-over between clock taps based on the position of the sampling edge of the clock signal in the delay line. The many variants in the implementation of these two principles differ from one another in the way they solve the switch-over problem between data taps or clock taps and in the manner they perform the correlation operation or evaluate the position of the sampling edge of the clock signal in the delay line respectively. Both these two principles have advantages and drawbacks. For instance, in the case of data sampling the delay line must be relatively long to cover possibly long successions of identical logical levels, e.g. zeroes or ones of a binary digital input signal, whereas in the case of clock signal sampling frequency errors may be corrected but at the cost of the creation of a clock signal jitter. Anyway, in the known data synchronization devices every digit of either the received data or the received clock signal has to be sampled individually. As a consequence, a relatively large amount of hardware is needed and, since the sampling frequency is generally much higher than that of the input clock signal, one has to pay attention not to loose any digit during the above tap switch-over.

SUMMARY OF THE INVENTION

An object of the present invention is to provide a data synchronization device which operates at a relatively low frequency and avoids the problems of the above known devices.

According to the invention, this object is achieved due to the fact that said data synchronization device includes:
- a plurality of counter means associated Express Mail No. TB16815911116S distinct logical levels of said digital input signal and each counting at the frequency of said input clock signal the number of successive digits having said associated logical level, thereby producing a count number;
- multiplexing means for multiplexing the count numbers of said plurality of counter means on a common output; and
- output means coupled to said common output and generating in synchronism with said output clock signal and for each of said count numbers a corresponding number of digits having the same logical level.

In this way, the delicate sampling operation mentioned above is completely eliminated. Moreover, the digits of the multi-level digital input signal are treated in groups which each include successive digits of a same logical level, e.g. zeroes or ones in case of a binary digital input signal. An advantage of such a collective data gathering is that, even in the worst case where the groups include only a single digit, the frequency at which the data synchronization device operates is at most the frequency of the input clock signal. Indeed, in the other more usual cases where the groups include a plurality of identical digits, the counter means still needs to count the digits at the frequency of the input clock signal, but other constituent parts of the data synchronization device are allowed to operate at a lower frequency, since the latter is a function of the number of identical digits constituting each group. As a result of this relatively low operating frequency, the implementation of the present data synchronization device is relatively easy and cheap.

Another characteristic feature of the present invention is that said data synchronization device further includes delay means for deriving from said input clock signal at least three intermediate clock signals shifted in phase with respect to each other, and that said counter means each includes:
- a set of at least three counters adapted to count said number of successive digits at the frequency of distinct ones of said intermediate clock signals, and to each produce a said count number including the number of counted digits;
- a majority voting means adapted to read said numbers of counted digits of the counters of said set and to compare them for detecting the largest subset of counters having produced the same number of counted digits; and
- selection means coupled to said set of counters and controlled by said majority voting means for reading the count number from a counter of said subset and for transferring said count number to said multiplexing means.

In this way, problems such as phase jitter, phase wander or frequency offset are avoided. Indeed, if for instance three intermediate clock signals and three counters are used, one is sure that two out of the three have no critical phase relation to the data or digit transition edge of the digital input signal and thus correctly count the number of successive digits. The majority voting means then detects this subset of two correctly operating counters and controls the selection means, which is a 3-to-1 multiplexer, to read the count number from one of the two counters of the subset.

In a preferred embodiment the phase of said three intermediate clock signals is shifted of about 0°, 120° and 240° with respect to said input clock signal from which they are derived.

The three intermediate clock signals are then equally spread over the 360° of a clock cycle, thereby optimizing the operation of the majority voting means.

Also another characteristic feature of the present device is that said count number also includes a logical level indicator indicative of the logical level of said successive digits counted by the associated counter means, and that said corresponding number of digits generated by said output means and their said same logical level respectively corresponds to said number of counted digits and to said logical level indicator included in said count number.

In case of a binary digital input/output signal, the logical level indicator may consist of only one bit indicating that the group is constituted by zeros or by ones according to this indicator bit being set or not. Moreover, the number of counted digits may generally consist in a word of 3 bits thereby allowing a possible succession of 8 identical bits. As a result, a count number of 4 bits is sufficient to fully define a group and the counters need only to be 3 bit counters each.

Still another characteristic feature of the present device is that said multiplexing means are coupled to said plurality of counter means for receiving at any level change of the logical level of said multi-level digital input signal the count number produced by the counter means associated to the logical level of the last digit of said digital input signal before said level change.

Moreover, the present data synchronization device further includes control means controlled by said multi-level digital input signal for activating, at said level change, at least the majority voting means of the counter means associated to the logical level of the last digit of said digital input signal before said level change, the activated majority voting means then reading said numbers of counted digits included in the count numbers produced by the counters of said counter means.

If said multi-level digital input signal is a binary signal, said plurality of counter means comprises a first counter means associated to the logical level 1 of said digital input signal and a second counter means associated to the logical level 0 of said digital input signal, said binary input signal being applied to said first counter means directly and to said second counter means via an inverter.

BRIEF DESCRIPTION OF THE DRAWINGS

The above mentioned and other objects and features of the invention will become more apparent and the invention itself will be best understood by referring to the following description of an embodiment taken in conjunction with the accompanying drawing wherein the FIGURE represents a data synchronization device according to the invention.

BEST MODE FOR CARRYING OUT THE INVENTION

Figure 1:
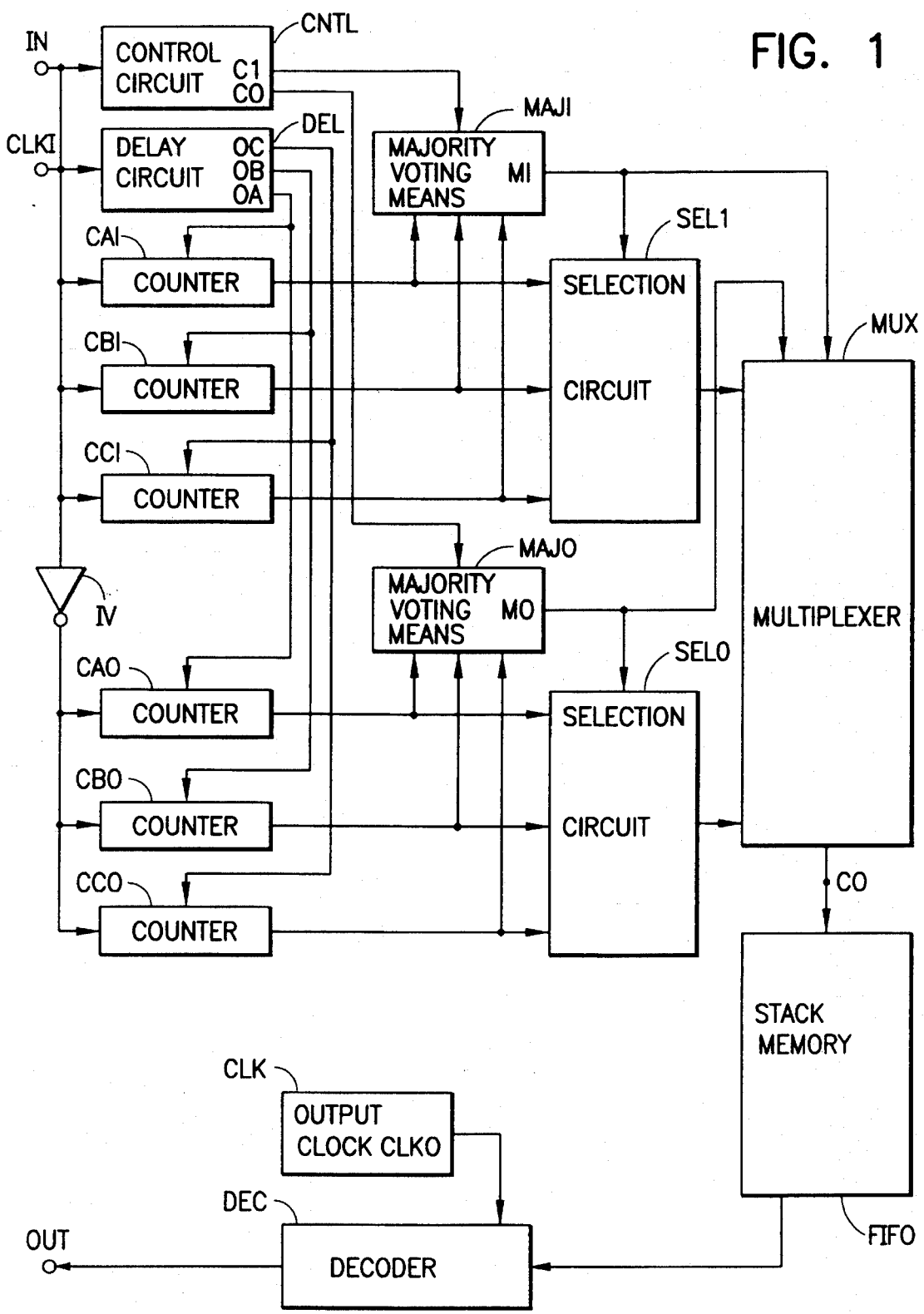

The data synchronization device shown in the FIGURE is used for providing, from a multi-level digital input signal IN received with an input clock signal CLKI to which IN is associated, a multi-level digital output signal OUT synchronizing with an output or local clock signal CLKO having the same frequency as CLKI. In the following part of the description, both the digital input signal IN and output signal OUT are supposed to be binary signals merely to simplify the explanations. The input signal IN and its associated input clock signal CLKI are received at a like named data input and clock input of the data synchronization device respectively, the output signal OUT is provided at a like named output terminal and the clock signal CLKO is generated by a local clock signal generator CLK.

In order to synchronize the output signal OUT with the local clock signal CLKO, i.e. to re-synchronize the input signal IN, the data synchronization device includes two counter means: one for counting the consecutive bits at the logical level 1 and the other for counting the consecutive bits at the logical level 0 of the input signal IN. Each of these counter means, which will be described in more detail later, provides at its output a count number comprising the number of counted consecutive bits having a same logical level and an indication of this level; i.e. an indicator bit set at the logical level 1 or 0. The count numbers are supplied to a multiplexer MUX which alternatively reads the two counter means and transfers the read count number to a First-In-First-Out stack memory FIFO via a common output CO. A decoder DEC then successively reads the count numbers from the FIFO and generates accordingly the binary output signal OUT. This digital output signal OUT is thus constituted by successive groups of identical bits 1 or 0, the number of bits constituting each group and their logical level being both given by the count number received from FIFO. Moreover, DEC operates under the control of the local clock signal CLKO generated by CLK whereby the bits of the digital output signal OUT are generated at the frequency of this local clock signal CLKO. As a result, the digital output signal OUT is a replica of the digital input signal IN but is fully synchronized with the output or local clock signal CLKO.

The counter means are controlled by a control circuit CNTL to which the input signal IN is applied and which has a first output C1 controlling the first counter means counting the groups of bits 1 and a second output C0 controlling the second counter means counting the groups of bits 0. In fact, the control circuit CNTL indicates the changes of level of the input signal IN and thereby the moment at which the number of bits counted by the counter means have to be transferred to the multiplexer MUX.

For counting the bits of the input signal IN, the two counter means operate under the control of the input clock signal CLKI. However, because of a possible phase shift between the signals IN and CLKI, the count operation, which is triggered by the input clock signal CLKI, may unfortunately occur on a state transition of the data of the input signal IN, i.e. on a change of the level of IN, thereby producing a faulty count number. In order to avoid this kind of problem, the input clock signal CLKI is not directly applied to the counter means but is first applied to a delay circuit DEL which produces three intermediate clock signals OA, OB and OC. These three intermediate clock signals are derived from the input clock signal CLKI but have a phase shift of about 0°, 120° and 240° with respect to CLKI. Moreover, each counter means includes three counters which are controlled by respective ones of the intermediate clock signals OA, OB and OC. As a result of their relative phase shifts, no more than one of the three intermediate clock signals OA, OB or OC can control a corresponding counter to operate on a state transition of the input signal IN thereby causing the production of a faulty count number the two other intermediate clock signals then controlling their corresponding counters to operate on a valid position of the bits of the signal IN. By selecting the set of at least two counters having counted the same number of bits amongst the three counters, one is sure that this number of counted bits is correct. The way this selection is performed is explained below.

The first counter means adapted to count the groups of successive bits having the logical level 1 includes three counters CA1, CB1 and CC1 to each of which the input signal IN is directly applied and which are controlled by the intermediate clock signals OA, OB and OC respectively. The outputs of these three counters CA1-CC1 are connected both to a distinct input of a majority voting circuit MAJ1 which is controlled by the control circuit CNTL via its first output C1 and to a distinct input of a selection circuit SEL1 also included in the first counter means respectively. The selection circuit SEL1 has an output connected to a first data input of the multiplexer MUX and both SEL1 and MUX are controlled by MAJ1 via a control output M1 thereof.

When a group of bits 1 of the input signal IN is supplied at the like named data input of the data synchronization device, the signal C1 at the like named first output of the control circuit CNTL is enabled, whilst the counters CA1, CB1 and CC1 all count the number of successive bits 1 constituting the group at the speed or frequency of the input clock signal CLKI or more particularly of the respective intermediate clock signals OA, OB and OC derived thereof.

It is to be noted that the counters CA1-CC1 are programmed to count only the positive values of the input signal IN, i.e. the bits 1 thereof, and that a group may comprise only a single bit 1.

As soon as a bit 0 appears at the data input IN, the counters CA1-CC1 stop counting, whilst the control circuit CNTL disables the signal C1 thereby activating the majority voting circuit MAJ1 to read the numbers of bits counted by the three counters CA1-CC1 and applied to its inputs. MAJ1 then compares these numbers and selects a set of at least two counters having counted the same number of bits as indicated above. Via its control output M1, MAJ1 then controls the selection circuit SEL1 to read the contents of one of the counters of the selected set and to transfer contents, i.e. the number of counted bits thereof, to the first data input the multiplexer MUX together with the indicator bit which is set to 1 for the present first counter means. The multiplexer MUX, which is also controlled by MAJ1 via the control output M1, reads the data at the output of SEL1, i.e. reads the count number provided by the first counter means, and transfers this count number to its common output CO. As soon as the count number is transferred to SEL1, the three counters CA1-CC1 are reset.

Similar to the first counter means, the second counter is adapted to count the groups of successive bits having the logical level 0. It includes three counters CA0, CB0 and CC0 to each of which the input signal IN is applied via an inverter IV and which are controlled by the intermediate clock signals OA, OB and OC respectively. The counters CA0-CC0 are similar to the above counters CA1-CC1 in that they only count the positive values of the signal applied thereto. This is the reason for the presence of the inverter IV which provides a positive value for each bit 0 of the input signal IN. The outputs of the three counters CA0-CC0 are connected both to a distinct input of a majority voting circuit MAJ0 which is controlled by the control circuit CNTL via its second output C0 and to a distinct input of a selection circuit SEL0 also included in the second counter means respectively. The selection circuit SEL0 has an output connected to a second data input of the multiplexer MUX and both SEL0 and MUX are controlled by MAJ0 via a control output M0 thereof.

When a group of bits 0 of the input signal IN is supplied at the like named data input of the data synchronization device, the signal C0 at the like named second output of the control circuit CNTL is enabled, whilst the counters CA0, CB0 and CC0 all count the number of successive bits 0 constituting the group at the speed or frequency of the input clock signal CLKI or more particularly of the respective intermediate clock signals OA, OB and OC derived thereof.

It is to be noted that, as for the above groups of bits 1, a group of bits 0 may comprise only a single bit 1.

As soon as a bit 1 appears at the data input IN, the counters CA0-CC0 stop counting while the control circuit CNTL disables the signal C0 thereby activating the majority voting circuit MAJ0 to read the numbers of bits counted by the three counters CA0-CC0 and applied to its inputs. MAJ0 then compares these numbers and selects a set of at least two counters having counted the same number of bits as indicated above. Via its control output M0, MAJ0 then controls the selection circuit SEL0 to read the contents of one of the counters of the selected set and to transfer the information, i.e. the number of counted bits thereof, to the second data input the multiplexer MUX together with the indicator bit which is set to 0 for the present second counter means. The multiplexer MUX, which is also controlled by MAJ0 via the control output M0, reads the data at the output of SEL0, i.e. reads the count number provided by the second counter means, and transfers this count number to its common output CO. As soon as the count number is transferred to SEL0, the three counters CA0-CC0 are reset.

It is to be noted that in each of the counter means more than three counters may be used and thus also more than three intermediate clock signals provided by the delay circuit DEL. The phase shifts between these intermediate clock signals will then preferably be equally spread over the 360° of a clock cycle thereby optimizing the operation of the majority voting means included in the counter means as it is the case in the presently described embodiment.

The count numbers read by the multiplexer MUX alternatively from SEL1 and SEL0 are transferred to the stack memory FIFO via the common output CO of MUX. As already mentioned, each count number not only includes the number of bits constituting a group of consecutive bits of a same logical level of the input signal IN but also includes an additional indicator bit indicating the value 1 or 0 of this level. In practice, the number of bit constituting a group as defined above rarely exceeds 8 whereby 3 bits sufficient to indicate the number of counted bits. A count number then includes 3+1=4 bits.

The decoder DEC reads the count numbers from the stack memory FIFO in the same order as they are stored therein by the multiplexer MUX. For each count number read from FIFO, DEC generates a number of identical bits corresponding to the number of counted bits and of which the level is defined by the indicator bit of this count number. These bits are supplied at the output terminal OUT and are generated at the speed or frequency of the output or local clock signal CLKO provided by the local clock generator CLK. They thus constitute the requested digital output signal OUT synchronized with the output clock signal CLKO.

While the principles of the invention have been described above in connection with specific apparatus, it is to be clearly understood that this description is made only by way of example and not as a limitation on the scope of the invention.

Having disclosed the invention, it is claimed:

1. A data synchronization device adapted to derive a multi-level digital output signal (OUT) synchronized with an output clock signal (CLKO) from a multi-level digital input signal (IN), associated with an input clock signal (CLKI) having substantially the frequency of said output clock signal, wherein said digital input signal consists of successive digits at one or another distinct level of a finite plurality of levels, characterized in that said data synchronization device includes:

a plurality of counter means (CA1-CC1, MAJ1, SEL1; CA0-CC0, MAJ0, SEL0), each including at least three counters (CA1-CC1; CA0-CC0) for sampling said digital input signal (IN) at three different times between successive arrivals of said digits, each said counter means associated with one of said distinct levels of said digital input signal (IN) and each counting, at said input clock signal (CLKI) frequency, successive digits all at said associated distinct level, and so forming a constant-level input sequence of digits, and producing a count number data signal indicating how many successive digits were counted;

multiplexing means (MUX), connected at its input to each of said counter means, for multiplexing said count number data signals of said plurality of counter means on a common output (CO); and output means (FIFO, DEC), connected to said common output and responsive to each said count number data signal, for generating in synchronism with said output clock signal (CLKO), for each said count number data signal, a number of digits as specified by said count number data signal, forming a constant-level output sequence of digits, all at the distinct level associated with the counter means that determined said count number data signal.

2. A data synchronization device according to claim 1, characterized in that it further includes a delay means (DEL), having an input connected to said input clock signal (CLKI) and having separate outputs (OA, OB, OC) respectively connected to one counter of each counter means, for deriving from said input clock signal (CLKI) at least three intermediate clock signals (OA-OC) shifted in phase with respect to each other, to control when each counter of each counter means samples said digital input signal (IN) to count successive digits, and wherein each counter means further includes:

a majority voting means (MAJ1; MAJ0) adapted to read said count number data signals produced by each counter of said counter means and to detect a counter from among said counters that produced a same count number data signal as a majority of said counters; and a selection means (SEL1; SEL0) connected to each of said counters and controlled by said majority voting means for reading said count number data signal from the counter detected by said majority voting means and for conveying said count number data signal to said multiplexing means (MUX).

3. A data synchronization device according to claim 2, characterized in that said three intermediate clock signals (OA-OC) are shifted in phase by 0°, 120° and 240°, respectively, from said input clock signal (CLKI).

4. A data synchronization device according to claim 2, characterized in that each said count number data signal also includes a level indicator to convey which of said distinct levels corresponds to said count number data signal, and in that said corresponding constant-level output sequence of digits generated by said output means (FIFO, DEC) conforms to both said number of counted digits and also to said level indicator included in said count number data signal.

5. A data synchronization device according to claim 1, characterized in that it further includes a majority voting means (MAJ1; MAJ0) adapted to read said count number data signals produced by each counter of said counter means and to detect a counter from among said counters that produced a same count number data signal as a majority of said counters; and in that said multiplexing means (MUX), upon a change from an old level to a new level of said digital input signal (IN), is responsive to a control output (M1; M0) of said majority voting means from the counter means associated with said old level, and reads a count number data signal from that counter means.

6. A data synchronization device according to claim 5, characterized in that it further includes control means (CNTL) responsive to said multi-level digital input signal (IN) for sending, when there is a change in level of said digital input signal from an old level to a new level, a control signal (C1; C0) to the majority voting means (MAJ1; MAJ0) of the counter means (CA1-CC1, MAJ1, SEL1; CA0-CC0, MAJ0, SEL0) associated with said old level, said majority voting means then reading said number of counted digits included in said count number data signal produced by each of said counters (CA1-CC1; CA0-CC0) of said counter means.

7. A data synchronization device according to claim 6, characterized in that, each said activated majority voting means (MAJ1; MAJ0) resets all counters (CA1-CC1; CA0-CC0) in its counter means after reading from each of said counters a count number data signal.

8. A data synchronization device according to claim 1, characterized in that said multi-level digital input signal (IN) is a binary input signal, and in that said plurality of counter means (CA1-CC1, MAJ1, SEL1; CA0-CC0, MAJ0, SEL0) comprises a first counter means (CA1-CC1, MAJ1, SEL1) associated with level 1 of said binary input signal (IN) and a second counter means (CA0-CC0, MAJ0, SEL0) associated with level 0 of said binary input signal, said binary input signal being applied to said first counter means directly and to said second counter means via an inverter (IV) connected to said binary input signal on one side and to said counters of said second counter means on its other side.

9. A data synchronization device according to claim 8, characterized in that each said count number data signal includes a level indicator that is a single bit.

10. A data synchronization device according to claim 1, characterized in that said output means (FIFO, DEC) includes memory means (FIFO) for storing a count number data signal received via said common output (CO) prior to generating the constant-level output sequence of digits which corresponds to said count number data signal.

11. A data synchronization device according to claim 2, characterized in that it further includes control means (CNTL) controlled by said multi-level digital input signal (IN) for activating (C1; CO), when said digital input signal changes level, at least the majority voting means (MAJ1; MAJ0) of the counter means (CA1-CC1, MAJ1, SEL1; CA0-CC0, MAJ0, SEL0) associated with the distinct level of the last digit of said digital input signal before said level change, said activated majority voting means then reading said numbers of counted digits included in the count number data signal produced by the counters (CA1-CC1; CA0-CC0) of said counter means.

12. A data synchronization device according to claim 4, characterized in that said level indicator is a single indicator bit which is set or reset according the level associated with said first (CA1-CC1, MAJ1, SEL1) or second (CA0-CC0, MAJ0, SEL0) counter means respectively.

\* \* \* \* \*